(12) United States Patent
Al-Sarawi

(10) Patent No.: US 7,424,303 B2
(45) Date of Patent: Sep. 9, 2008

(54) METHOD AND SYSTEM TO ENABLE MOBILE TRANSACTIONS

(76) Inventor: Saleh Al-Sarawi, P.O. Box 13014 SAFAT, Kuwait City (KW)

( * ) Notice: Subject to any disclaimer, the term of this patent is extended or adjusted under 35 U.S.C. 154(b) by 396 days.

(21) Appl. No.: 11/192,154

(22) Filed: Jul. 28, 2005

(65) Prior Publication Data

US 2006/0240852 A1 Oct. 26, 2006

(30) Foreign Application Priority Data

Apr. 21, 2005 (GB) ................................ 0508058.5

(51) Int. Cl.
*H04Q 7/20* (2006.01)
(52) U.S. Cl. ................ 455/466; 455/550.1; 455/556.1; 705/24; 705/39; 705/64; 705/75
(58) Field of Classification Search ................ 455/466, 455/550.1, 406–408, 556.1–2, 557–558; 705/24, 64, 75, 39
See application file for complete search history.

(56) References Cited

U.S. PATENT DOCUMENTS

| | | | |
|---|---|---|---|
| 7,039,389 B2* | 5/2006 | Johnson, Jr. ................ 455/406 |
| 7,219,149 B2* | 5/2007 | Ofir et al. .................... 709/224 |
| 2002/0091579 A1 | 7/2002 | Yehia et al. |
| 2002/0107904 A1 | 8/2002 | Talluri et al. |
| 2003/0022655 A1* | 1/2003 | Bogat .......................... 455/406 |
| 2003/0162565 A1* | 8/2003 | Al-Khaja .................... 455/558 |
| 2005/0015332 A1* | 1/2005 | Chen ............................ 705/39 |
| 2006/0148495 A1* | 7/2006 | Wilson ....................... 455/466 |
| 2007/0197192 A1* | 8/2007 | Cho ............................ 455/411 |

FOREIGN PATENT DOCUMENTS

| | | |
|---|---|---|
| WO | WO 01/98983 A1 | 12/2001 |
| WO | WO 03/090133 A2 | 10/2003 |

OTHER PUBLICATIONS

Search Report from GB0508058.5, Examiner Kalim Yasseen, Date of search Jul. 19, 2005.

* cited by examiner

*Primary Examiner*—Cong Van Tran
(74) *Attorney, Agent, or Firm*—John Bruckner PC

(57) ABSTRACT

A system and method for allowing users to specify using commonly available mobile devices such as mobile telephones, transactions to be performed is described. More particularly, the invention provides a transaction interface layer which uses a predetermined lightweight message syntax to allow a user to specify transactions to be performed. The particular transactions envisaged are financial transactions such as stock or share trades, but the invention also allows other transaction types, such as information transactions, to be specified. When an information transaction is specified, the system of the invention acts to filter received information in accordance with a user-specified transaction, and to forward filtered information to a user mobile device as appropriate.

14 Claims, 7 Drawing Sheets

METHOD AND SYSTEM TO ENABLE MOBILE TRANSACTIONS

CROSS-REFERENCE TO RELATED APPLICATION

This application is related to, and claims a benefit of priority under one or more of 35 U.S.C. 119(a)-119(d) from copending United Kingdom patent application 0508058.5, filed Apr. 21, 2005 the entire contents of which are hereby expressly incorporated herein by reference for all purposes.

TECHNICAL FIELD

The present invention relates to a system for allowing transactions to take place using a mobile communications device, and associated method of operation thereof. In addition, the present invention also relates to a computer program and computer storage medium storing a computer program arranged to perform such a method.

BACKGROUND TO THE INVENTION AND PRIOR ART

It is known to provide electronic interfaces to a trading environment, in order to allow trading of financial instruments such as stocks or the like. Web-based stock brokerage systems are particularly prevalent, such as those available before the priority date at the following URLs www.morganstanley.com and www.merrilllynch.com. Such systems allow a user to perform online trading of stocks and shares, commonly for either a percentage or fixed fee which was less than was traditionally the case. In addition to electronic brokerages, electronic stock ticker services are also known which provide news messages in the form of share prices, volumes of share trades, or the like. An example of such a stock ticker service is that provided by the well known information company Reuters, and in particular the Reuters Market Monitor Service described at http://about.reuters.com/productinfo/rmm/?seg=9.

However, such electronic, and particularly web based, news and brokerage services provide rich content in that they make particular use of graphics, which require a relatively high bandwidth connection and high resolution screen display facilities. As such, they are useful for users provided with desktop or laptop computers provided with fully functional browsers, but cannot be used by users with less functional devices, and in particular by mobile users provided with commonly available mobile devices, such as GSM telephones. However, there is clearly a need to allow users mobile access to stock trading services, in order to permit trades to be made and monitoring to be maintained of a portfolio and other news when a user is away from his fully functional laptop or desktop computer.

SUMMARY OF THE INVENTION

In view of the above, the present invention provides a method and system for allowing users provided with a mobile device such as a mobile telephone to access trading information and facilities using their mobile devices. More particularly, the present invention provides a method and system which acts as an interface layer between existing stock information and trading systems and a users' mobile device, by providing a command set with simplified syntax which is suitable for use with short messages such as are commonly sent from mobile devices. The short messages may be in the form of short message service (SMS) messages, multimedia message service (MMS), messages via e-mail on a GPRS device or the like. The system provided by the invention is able to translate the simplified command set into necessary trading actions in order to permit the buying and selling of stocks and shares, and the setting up of monitoring services for particular stocks or shares. The invention also therefore provides for easy mobile monitoring of stock and share price and trading volume changes via the maintenance of user profiles indicating stocks and shares in which a particular user is interested. Messages in an appropriate format for the users' device can then be formulated for transmission to the users' mobile device, passing on information concerning the stocks in which the user has registered an interest. Again, the simplified command set permits the setting up and maintenance of such monitoring services.

In view of the above, from a first aspect there is provided a transaction interface system comprising: an input arranged to receive user messages sent via a mobile telecommunications network from user mobile devices; a message parser arranged to parse said user messages received at said input in accordance with a predetermined lightweight message syntax, to determine the information content of each message; and a transaction controller arranged to perform one or more user transactions in response to the information contained within said user messages as determined by said message parser.

From another aspect the invention also provides a transaction interface method comprising the steps of: receiving user messages sent via a mobile telecommunications network from user mobile devices; parsing said received user messages in accordance with a predetermined lightweight message syntax, to determine the information content of each message; and performing one or more user transactions in response to the information contained within said user messages.

Further features of the invention will be apparent from the appended claims.

BRIEF DESCRIPTION OF THE DRAWINGS

Further features and advantages of the present invention will become apparent from the following description of embodiments thereof, presented by way of example only, and by reference to the accompanying drawings, where in like reference numerals refer to like parts, and wherein:—

DESCRIPTION OF THE EMBODIMENTS

A first embodiment of the invention will be described with respect to FIGS. 1 to 8.

Figure 1:
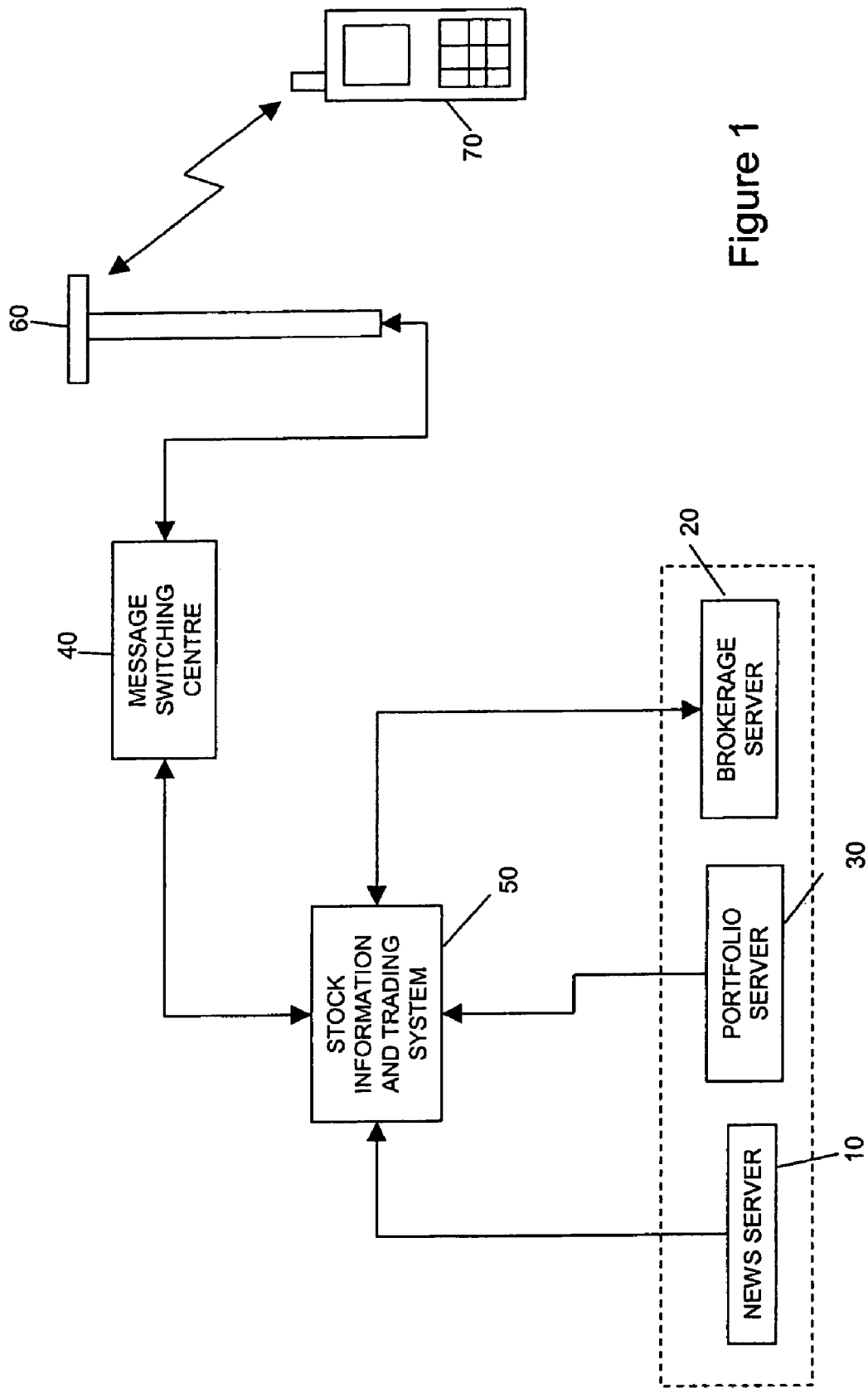
FIG. 1 is an architectural block diagram illustrating the overall system architecture in which the present invention is used.

FIG. 1 is a block diagram which illustrates the overall system architecture of the present invention, and in particular where embodiments of the invention sit within that architecture. In particular, embodiments of the present invention provide for an interface layer to allow users utilising mobile devices such as mobile telephones or the like to access trading systems, so as to perform trades using the trading system, and to set up news and information alerts concerning items of interest to the user. The access technology to actually access the users' mobile device is conventional, in that a standard cellular telephone network, such as, for example, a GSM, GPRS or UMTS network is used, but with messages being passed from a message switching centre in such a network to the stock information and trading system of embodiments of the invention, which act to provide an interface between the mobile network and the back end trading systems. Such an architecture is shown in FIG. 1. Here, a stock information and trading system 50 provided by embodiments of the invention is arranged to receive news messages from a news server 10, the news messages relating to items of news which may be of interest to the user, such as stock prices, trade volumes, company changes, or the like. In addition, a brokerage server 20 is also provided as part of the back end trading systems, and which is arranged to communicate with the stock information and trading system to place translation order messages with the brokerage server 20, which in turn then performs the instructed trade. Trades may be, for example, purchases or sales of stocks and shares. That is, it is the brokerage server 20 which actually performs the required transaction, in response to transaction order messages received from the stock information and trading system 50.

Additionally provided is a portfolio server 30. The portfolio server 30 acts to maintain stock and share portfolio records for users registered with the server, and to provide information messages relating to a particular users' portfolio to the stock information and trading system 50. The portfolio server 30 may be integrated either with the brokerage server 20, or the news server 10 in an integrated service. Similarly, the news server 10, portfolio server 30 and brokerage server 20 need not be actually separate physical or logical entities, and can be provided by an integrated service to the stock information and training system 50. The functioning of the news server 10, brokerage server 20, and portfolio server 30 is outside the scope of the present invention, suffice to say that services which perform the above described functions of these entities are known in the art. Examples of such prior art services known before the priority date were listed in the introduction. Together, the news server 10, portfolio server 30, and brokerage server 20 form what are referred to herein as the back end trading systems.

As discussed above, the purpose of embodiments of the invention is to allow a mobile user to access the back end trading systems, to obtain news, and to perform transactions. To this end, the stock information and trading system 50 provided by embodiments of the invention is logically connected to a message switching centre 40 which forms part of the mobile telephone network to which the user belongs. The message switching centre 40 receives data messages via a logical connection from a cellular access point or base station 60, which in turn receives data messages via a wireless interface from a user mobile device 70. In a preferred embodiment, the data messages sent from the user mobile device 70 are short message service (SMS) messages containing text. In other embodiments, however, depending upon the capabilities of the mobile network and the user mobile device 70, the messages may be e-mail messages or multimedia messaging service (MMS) messages. The latter two message formats are particularly useful when the mobile network and the user mobile device 70 are GPRS or UMTS capable.

Concerning the logical connections between the various system elements, within the preferred embodiment the connectivity between the message switching centre 40 and the stock information and trading system 50 is preferably by virtue of a TCP/IP Virtual Private Network connection. Such connections are well known in the art, and are preferable in this case so as to ensure security of the messages being passed between the message switching centre 40 and the stock information and trading system 50.

Concerning the connections between the stock information and trading system 50 and the back end trading systems, where the back end trading systems are logically located outside the local network of the stock information and trading system 50, there is similarly a TCP/IP VPN connection preferably formed between the back end trading systems and the stock information and trading system 50. In other embodiments, it may be that the stock information and trading system 50 and any one or more of the back end trading systems may be located within the same local network, in which case the local area network connection between the various servers is sufficient. Various local area network types are well known in the art to the skilled person.

Figure 2:
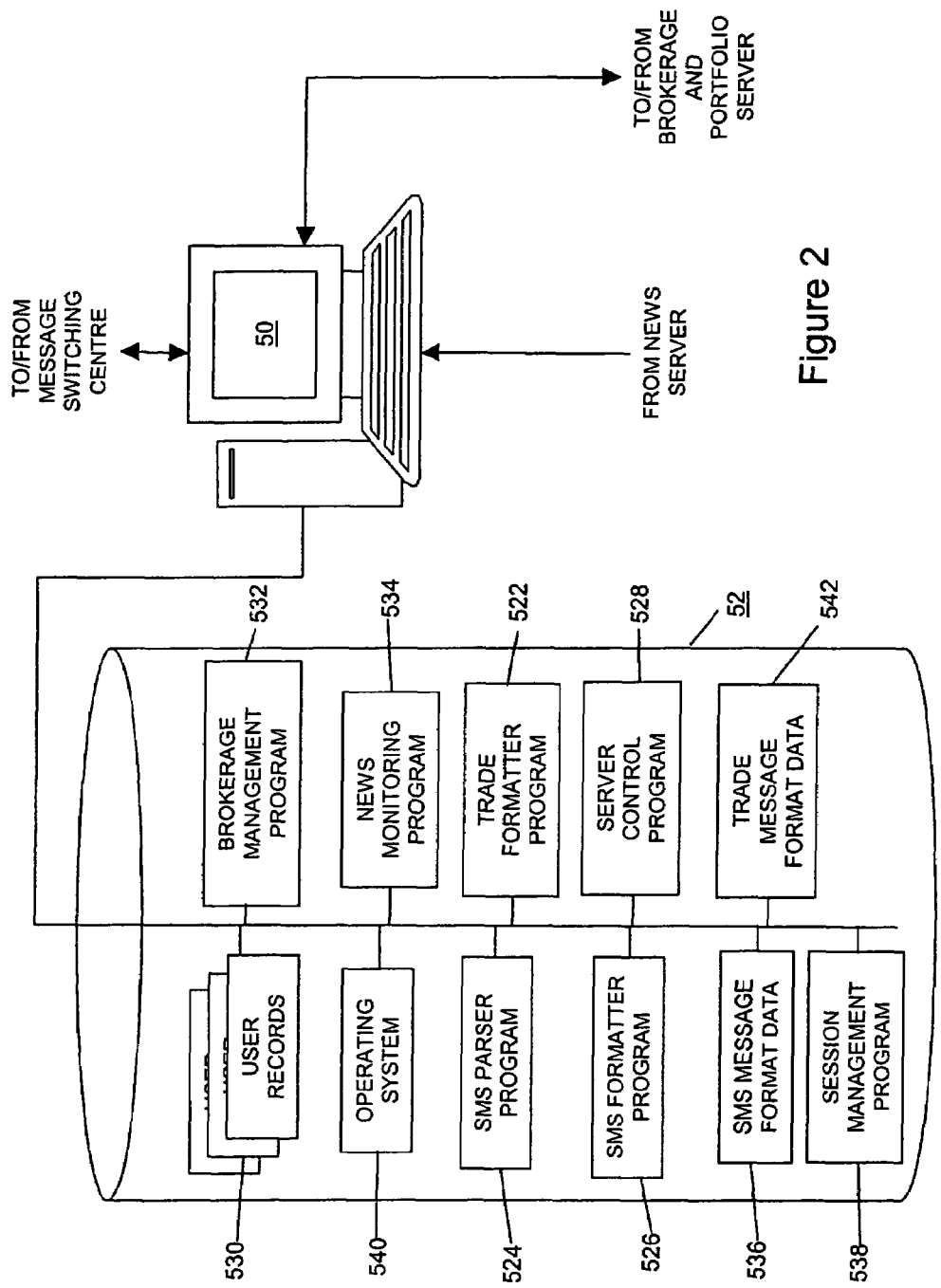
FIG. 2 is a system block diagram of a computer system provided with computer readable storage medium storing programs which together provide a first embodiment of the present invention.

Turning now to FIG. 2, the specific elements of the stock information and trading system 50 are discussed in more detail.

More particularly, the stock information and trading system 50 is preferably physically embodied in a standard general purpose computer provided with appropriate network cards to make the suitable logical connections described earlier, and provided with a suitable processor, memory, and mass storage devices to enable programs to control the computer to perform the necessary functions to be stored and executed thereby. The general purpose computer 50 therefore preferably contains a mass storage computer readable storage medium 52, such as a hard disk or the like. Other suitable mass storage media are known in the art, such as CD or DVD based optical disks, zip drives, or the like. Similarly, the computer system 50 may be provided with suitable memory in which to store and execute the necessary programs.

In the preferred embodiment, the mass storage device 52 has stored thereon numerous programs and data as detailed next. In particular, an operating system program 540 is provided which provides the usual standard operating system functions to allow the general purpose computer 50 to operate. Additionally, specific to the embodiments in the invention being described, the mass storage device 52 also stores sets of user records 530, in which is stored data information specific to each user. A brokerage management program 532 is also stored which acts to manage the stock information and trading system's transactions with the brokerage server 20 and portfolio server 30 in the back end trading system. A news monitoring program 534 is also provided, which handles the stock information and trading system's interactions with the news server 10. A trade formatter program 522 is further provided, which acts to perform the actual trade transaction with the brokerage server 20, under the control of the brokerage management program 532. The actions performed by the trade formatter program 522 are therefore highly dependent upon the particular brokerage service provided by the brokerage server 20. The trade formatter program 522 makes use of the trade message format data 542 stored on the mass storage device, and which provides specific information as to the form of information required by the brokerage server 20.

A server control program 528 is also provided, which operates to provide overall control of the general purpose computer 50 to cause the computer 50 to operate as the stock information and trading system. The server control program 528 therefore provides functions to receive messages from the back end trading system and also from the mobile telephone network, and to invoke the other programs described and to be described, as necessary.

An SMS parser program 524 is also provided, and which is invoked under the control of the server control program 528 to parse messages received from the message switching centre 40 within the mobile network. Of course, although termed an SMS parser program here, the message format may be SMS, but may also be e-mail, or MMS, or the like, depending on the mobile network technology. Likewise, an SMS formatter program 526 is also provided, which acts to format messages to be sent from the stock information and trading system 50 via the mobile network to the end users' mobile device 70. The messages to be sent from the stock information and trading system 50 may be SMS messages, or similarly may be either e-mail or MMS messages, depending upon the particular mobile technology used. The SMS formatter program 526 is capable of producing messages in whichever format is suitable for the mobile technology being used.

In order to allow operation of the SMS formatter program 526, and the SMS parser program 534, SMS message format data 536 is provided, which contains data relating to the syntax of messages received from the mobile user device 70 and to be sent from the stock information and trading system 50. The SMS message format data 536 therefore defines the syntax of a set of simple commands to be received by the stock information and trading system 50 from the mobile user device 70, and which cause the stock information and trading system 50 to operate. The message syntaxes are described later.

Finally, user session management program 538 is also provided, which acts to manage a particular users' session with the stock information and trading system 50, and in particular to validate user transactions, perform user session time outs, and the like.

The operations of all of the above programs will be described in further detail later.

Figure 3:
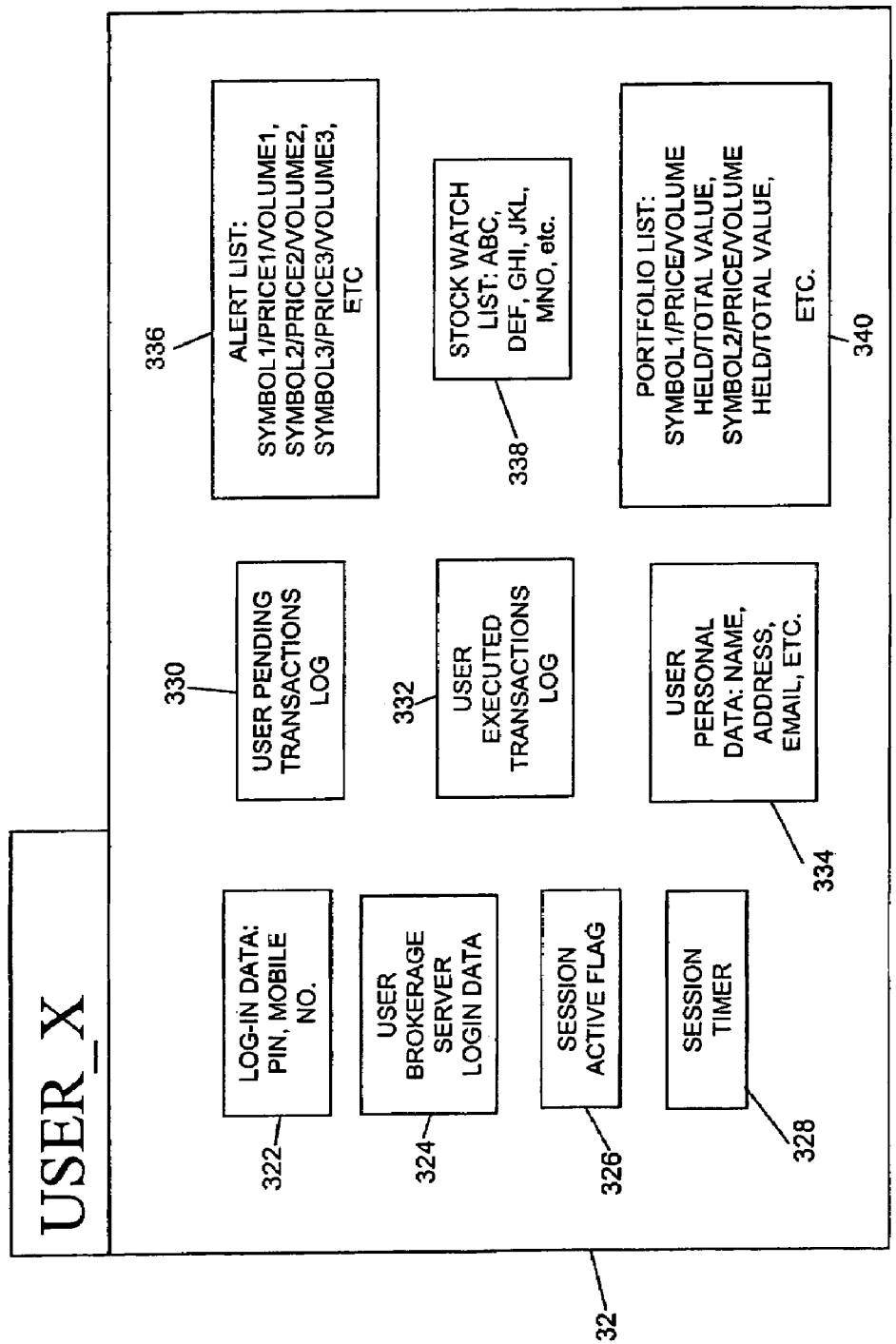
FIG. 3 is a representation of the various data and data items stored for a particular user in an embodiment of the present invention.

Turning to FIG. 3, FIG. 3 illustrates a particular user record 32, which is stored as one of the user records 530 on the mass storage device 52. With reference to FIG. 3, the particular user record 32 indicated belongs to user "user_x" and contains the various user specific data contained therein. More particularly, log-in data 322 is stored, which comprises the registered personal identification number (PIN) for the user, as well as the mobile telephone number of the users' mobile device 70. The users' PIN number is used in conjunction with the users' mobile number (received from the mobile network using calling line identifier (CLI) technology or the like) to validate the user identity, in order to allow the user to use mobile device 70 to log in to the stock information and trading system 50.

Additionally provided is user brokerage server log-in data 324, which stores the necessary user specific data to allow the stock information and trading system to log in to the brokerage server 20 on behalf of the user. This data 324 is particularly used when the service provided by the brokerage server 20 is user specific, in that the brokerage server 20 stores a specific account for the particular user in respect of which transactions are performed. Thus, for example, the user brokerage server log-in data 324 may comprise a user ID and log-in password or the like, to allow the stock information and trading system 50 to log-in to the brokerage sever 20 on the users' behalf.

Also provided is a session active flag 326, and a session timer 328. The session active flag 326 is a simple digital flag which is set to one particular value when the user is logged in and the user session active, and to another particular value when the users' session has expired, or he has logged out. The session active flag 326 is set by the session management program 538. In a similar vein, the session timer 328 is a time stamp set by the session management program 538, and which records the time when a user last validly logged in, or alternatively last sent a message which was acted on by the system 50. The session timer 328 allows for automatic time out of a users' session if the user does not send valid messages within a certain time of the session time stamp recorded by the session timer 328.

Also provided in the user record 32 is a user pending transaction log 330, which records the contents of user transaction messages which have not yet been passed to the brokerage server for execution. Similarly, a user executed transactions log 332 is also provided, which stores the contents of user transaction messages which have been passed to the brokerage server 20 for execution. User personal data, such as name, address, e-mail address, contact telephone numbers and the like is also held as data 334.

Additionally, a list of active user alerts 36 is also stored. User alerts are logical conditions relating to particular stocks or shares, and in particular to prices of such stocks or shares, or trade volumes of such stocks and shares, and which can be set at certain values for specific stocks and shares. The system 50 then monitors news items received from the news server 10 relating to stock and share price and trade volumes, and compares them to the active alerts in a users' alert list, to see if the logical conditions set by the alert are met. If the logical conditions are met, then the stock information and trading system 50 sends a message to the user mobile device 70 informing him of the alert having been met.

Additionally, a stock watch list 338 comprising a list of valid three letter stock indicators is also stored. This stock watch list is used by the news monitoring program to filter news items received from the news server 10 to determine news items which should be forwarded to the user mobile device 70. In particular, where a news item arrives which relates to a particular stock on the stock watch list, then the content of the news item relating to that stock is forwarded as a message to the user mobile device 70.

Finally, also stored within the user record 32 is portfolio information received from the portfolio server 30, in the form of a portfolio list. Here, a list indexed by three letter stock code is held for each user, indicating the amount of the users' holdings of each stock in the list. In addition, the price at the close of the last day's trading is also held with respect to each stock, as well as the total value of each users' particular stock holding, being the product of the price of each stock, and the volume held of each stock. The portfolio list 340 is updated by receiving portfolio messages from the portfolio server 30, preferably once a day at the end of each day's trading.

Having described the architecture, programs and the data used in the system, the overall information and trading system operation of the embodiments will now be described with respect to FIG. 4.

Figure 4:
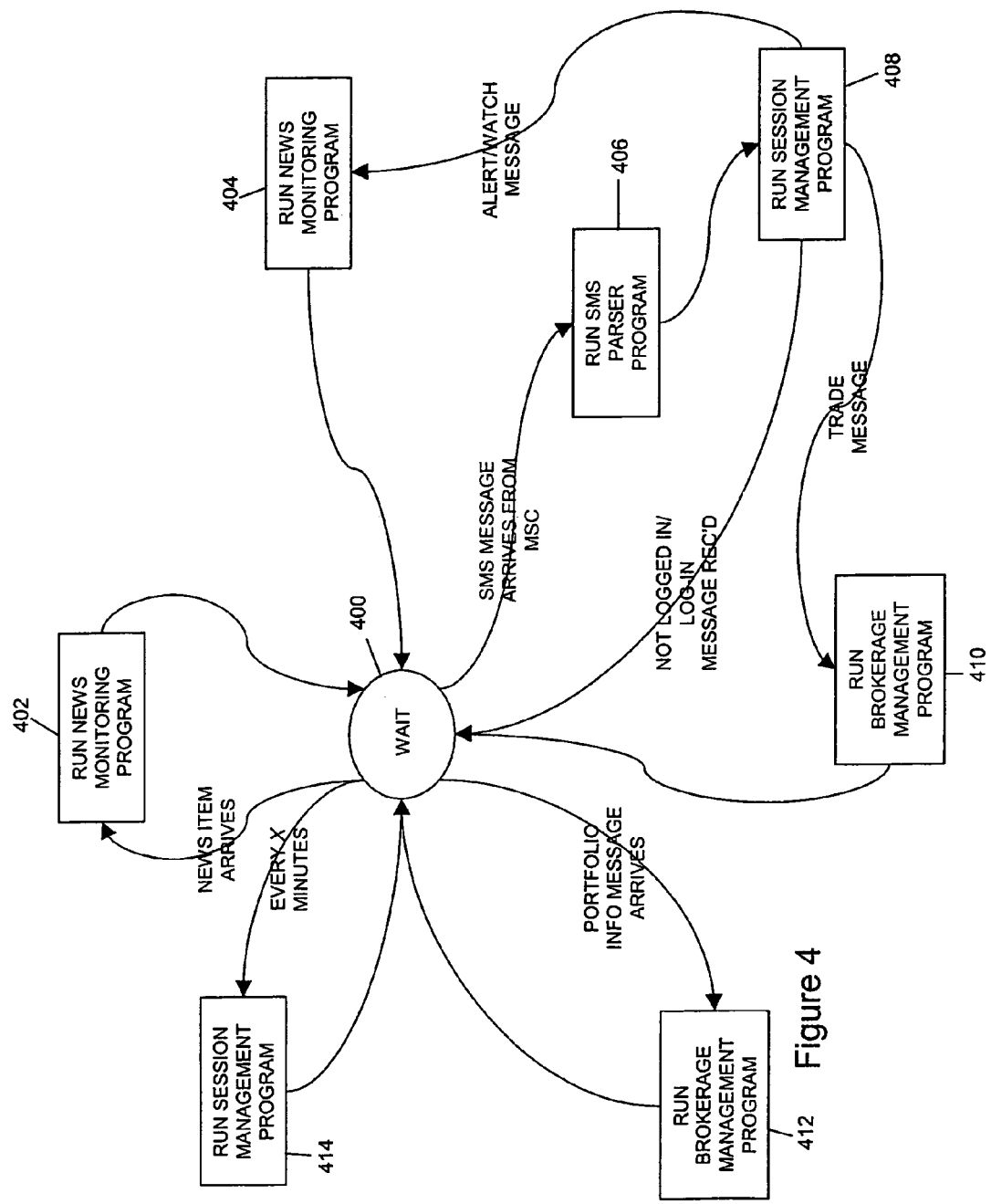
FIG. 4 is a state diagram illustrating the overall operation of an embodiment of the present invention.

FIG. 4 is a state transition diagram illustrating the operation of the stock trading and management system 50 of the described embodiments of the invention. More particularly, as described previously with respect to FIG. 2, the stock trading and management system 50 is preferably embodied by a general purpose computer system 50 having an operating system 540, and which is controlled by the server control program 528 to operate as the stock information and trading system 50. FIG. 4 therefore represents a state diagram showing the states of operation of the general purpose computer system 50 when executing the server control program 528, so as to be controlled thereby. Within the remainder of this specification, references to the stock information and trading system 50 can be taken to be references to the general purpose computer system 50 under the control of the server control program 528, and the other programs described previously, when invoked by the server control program.

---
L <PIN>
e.g. L 1234

---

Once a user is logged in, then he has the ability to perform market transactions, as well as to set monitoring services, as described later.

A second type of message which may be received from the mobile user is a market transaction or trade message. As will be described later, such trade messages are only accepted when a valid session is in progress, preferably in the correct syntax. The preferred syntax includes the symbol of the stock, the quantitity, and the desired price, followed by the users' PIN number. The preferred syntax is set out below:—

---
<STOCK SYMBOL> Q <QUANTITY> P <PRICE> <TRANSACTION PIN>
e.g. NBK Q5000 P.1.750 1234

---

With reference to FIG. 4, therefore, the stock information and trading system 50 when in operation is generally within a central wait state 400. This "wait" state is exited upon the occurrence of a number of state edge exit conditions to be described.

The first state edge exit condition is when a message arrives from the message switching centre 40 to the stock information and trading system 50, being a message from the user mobile device 70. As mentioned previously, this message may be an SMS message, e-mail message, MMS message, or the like. When such a message arrives on the input from the message switching centre the stock information and trading system 50 enters the state 406, wherein the message parser program 524 is invoked and run. The message parser program 524 acts to parse the received message, to determine the contents thereof. The operation of the message parser program 524 is shown in FIG. 5, described next.

Figure 5:
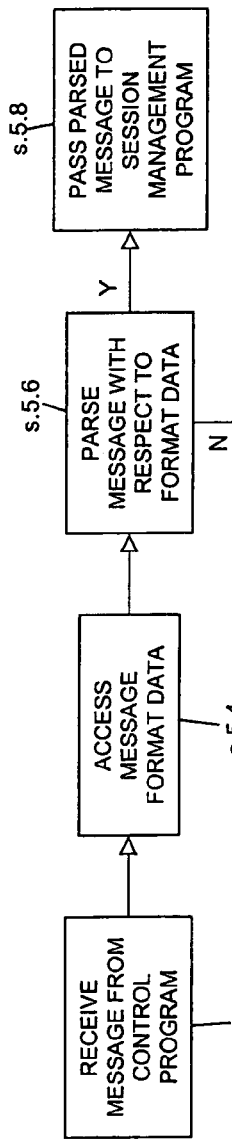
FIG. 5 is a flow diagram illustrating the operation of a message parser program used in an embodiment of the present invention.

With reference to FIG. 5, when executed the message parser program 524 first receives the received data message passed to it from the control program 528, at step 5.2. Then, the message parser program 524 accesses the message format data 536 stored on the mass storage device 52, which message format data specifies the syntax of all of the different types of messages which might be received by the stock information and trading system. The various different message types, and their preferred syntax are described next.

A first type of message which might be received is a log-in message. To log-in to the stock information and trading system 50, a user uses the user mobile device 70 to send a message via the mobile telephone network to the stock information and trading system 50. In this respect, the stock information and trading system 50 is allocated a dedicated number by the mobile network, such that a message received at the message switching centre 40 within the mobile telephone network can be determined to be routed to the stock information and trading system 50. In order to constitute a log-in message, in described embodiments the body of the message should include the letter "L" followed by the users' specific PIN code. The users' specific PIN code is stored as part of the users' specific record 32, within the log-in data 322. The preferred syntax for a log-in message is shown below:—

In order to differentiate whether the trade is a buy or a sell order, the letter "B" (for buy) and "S" (for sell) can be appended in front of the above syntax. Thus, for example, a buy order would look like:—

B NBK Q5000 P 1.750 1234

Whereas a sell order would look like:—

S NBK Q5000 P1.750 1234

Using the above syntax, market transactions can be specified using the relatively sparse content available from messages sent from user mobile devices.

In addition to performing market transactions, the stock information and trading system 50 of embodiments of the invention also provides for a news monitoring service, and messages to allow a user to manage such a service may also be received. The format of these messages is discussed next.

The first such news management message is a message which adds a stock to the users' stock watch list 338 held in the specific user record 32. To achieve this, the command word "ADD" is sent, followed by a valid stock symbol. Thus, the preferred commend syntax is as follows:—

---
ADD <STOCK SYMBOL>
e.g. ADD NBK

---

As described later, upon receipt of such a message the users' stock watch list 338 is updated.

It should also be possible for a user to remove a stock from their watch list. The preferred command syntax for stock watch removal is as follows:—

---
D <STOCK SYMBOL>
e.g. D NBK

---

Receipt of such a message will delete the indicated stock symbol from the users' stock watch list.

In addition to maintaining the stock watch for news items which relate to specific stocks, the stock information and trading system 50 also allows for user "alerts" to be specified which allow a user to specify a stock symbol, a price target, and/or a volume of trades which the system is to look out for, and alert the user when such conditions have occurred. Such alerts are thought to ensure faster reaction to market news, updates, and circumstances. Alerts can be set per price change, per volume of trade, or a combination of both. The example syntax is shown below:—

ALERT S<STOCK SYMBOL> P<PRICE>/V<VOLUME>
e.g. ALERT SNBK P1.500 V50000

The above example sets an alert that alerts the user when the stock NBK changes price by 1.5 units and when a trade of 50,000 shares has taken place. In order to set an alert where only price or volume is taken into account, then only that information is included in the command, i.e. the command:—

ALERT SNBK P1.500 would cause an alert to be sent when the price of the NBK stock changes by 1.5 units, irrespective of the volume of trades. Likewise, alerts can be set in dependence on trade volume alone, in a similar manner.

The user should also have the capability to remove any set alerts, and this is by sending a message in the following format:—

RALERT <STOCK SYMBOL>
e.g. RALERT NBK

The receipt of such a message would cause any alerts relating to the stock symbol NBK to be removed from the data alert list 336. Where a user has more than one alert in his alert list 326 relating to the same stock, then he can specify removal of that particular alert by further specifying in the remove alert command the particular alert which he wishes to remove i.e. RALERT NBK P1.500, would remove the alert in respect of stock NBK with a price change of 1.5 units.

With the above message syntax the invention provides a very lightweight mechanism for allowing a user to interact with and control the stock information and trading system 50, so as to perform market transactions, and also to manage a news information service. The lightweight message formats are information-sparse, in that they contain only the minimum set of information needed to define the required transaction, and hence are particularly adapted for use with a user mobile device such as a mobile telephone, sending SMS messages or the like. Moreover, the lightweight message formats are also particularly machine parseable to allow for automated operation.

Returning to a consideration of FIG. 5, at step 5.4 having accessed the message format data the message parser program then compares the received message with the message format data at step 5.6, in order to parse the message to gain an understanding of the content thereof. If the message parser program 524 is unable to match the received message with any identifiable message format, then at step 5.10 the message parser program invokes the SMS formatter program 526, to format a reply message with the message "invalid syntax". The SMS formatter program 526 then causes such a message to be sent to the message switching centre 40 of the mobile network, for forwarding to the mobile user device 70. The operation of the SMS formatter program 526 in this respect is not shown.

On the contrary, if at step 5.6 the message parser program 524 is able to match the received message to any of the stored message formats to parse the message, then the parsed message is then passed to the session management program at step 5.8. In this respect, with respect to FIG. 4, the state 406 is then exited, and state 408, wherein the session management program is run is entered.

Figure 6:
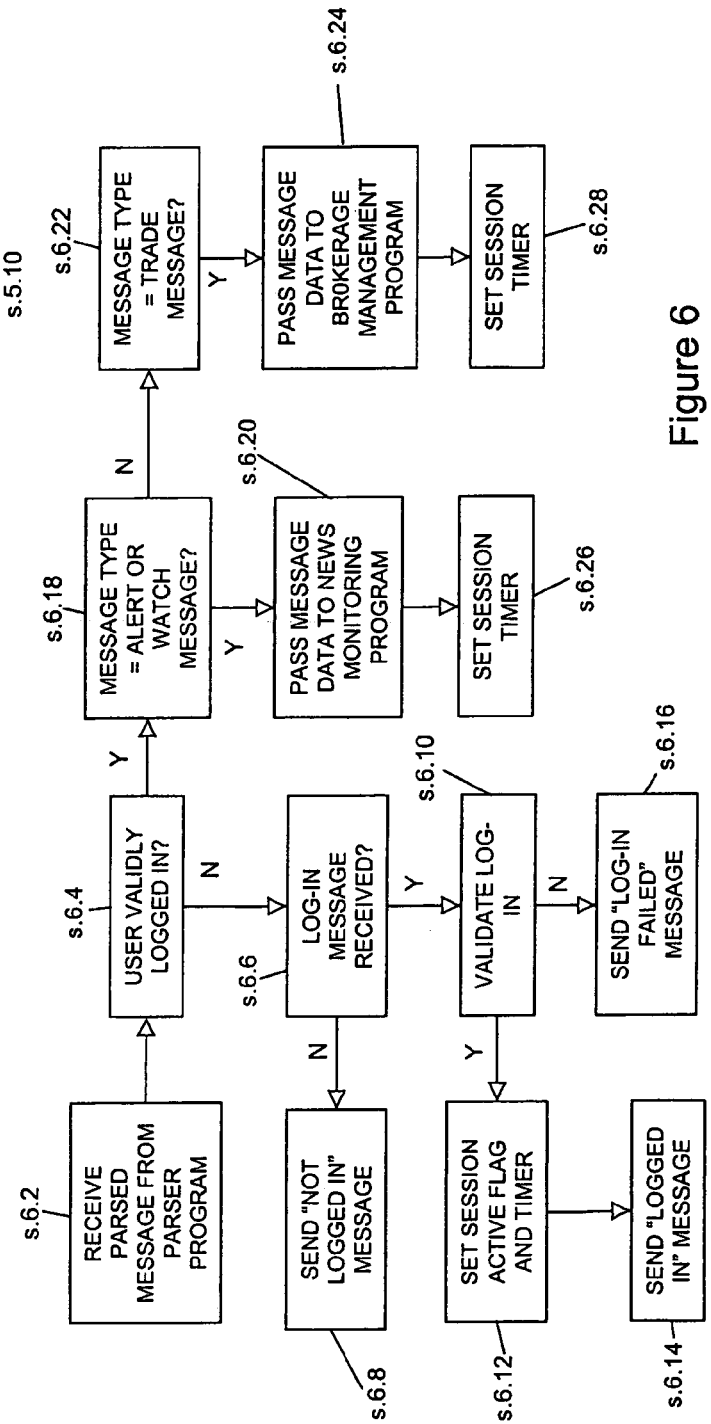
FIG. 6 is a flow diagram illustrating the operation of a session management program used in an embodiment of the present invention.
Figure 7:
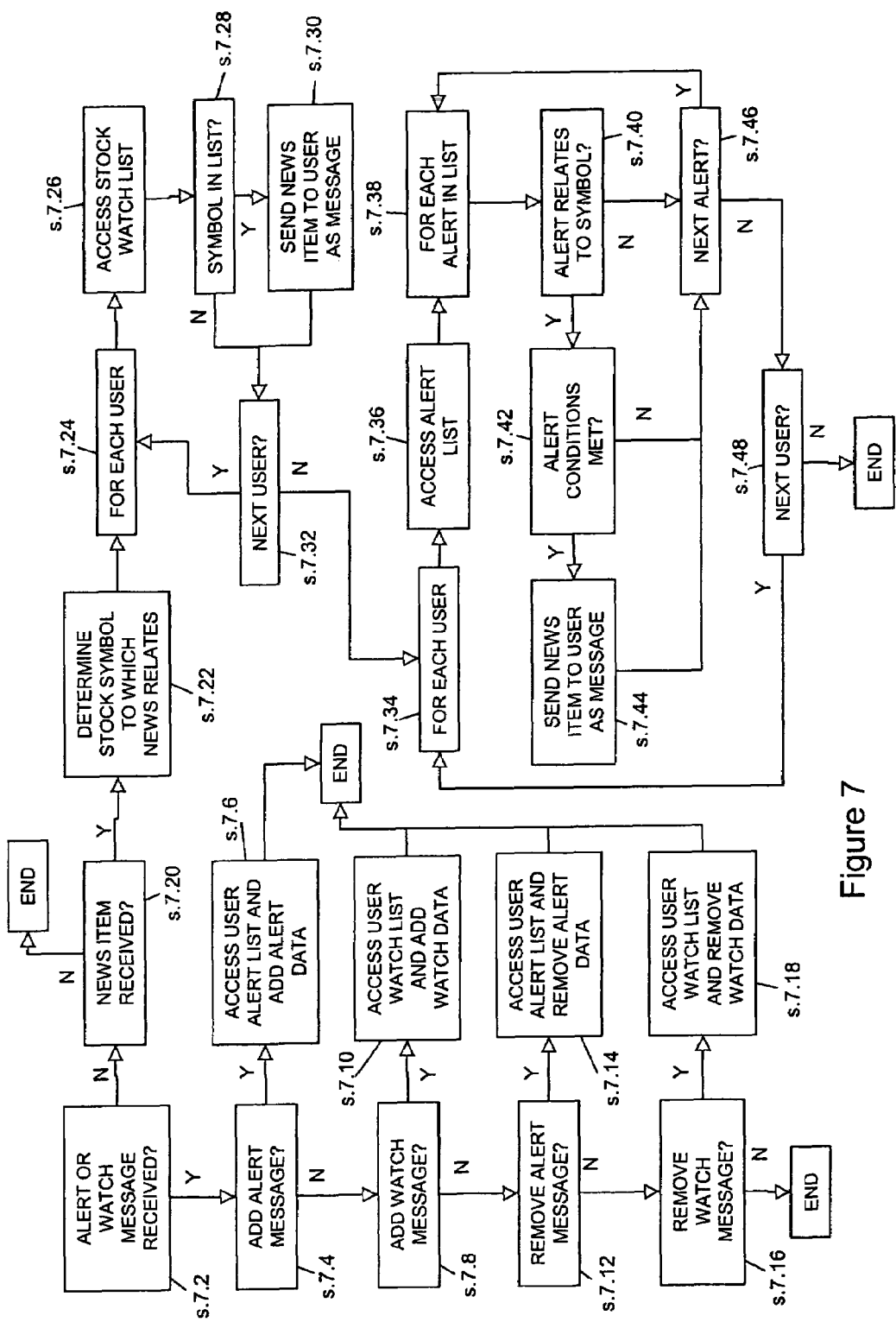
FIG. 7 is a software flow diagram illustrating the operation of a news monitoring program used in an embodiment of the present invention.

The operation of the session management program 538 is illustrated in FIG. 6. Please note that FIG. 6 illustrates the operation of the session management program when it receives a parsed message from the message passer program 524. Therefore, at step 6.2 the session management program receives a parsed message from the parser program, together with an indication from the parser program as to the type of message which was received, as well as the contents of the message. Next, at step 6.4 the session management program determines whether the user is validly logged in. This evaluation is determined from reviewing the session active flag 326 for the particular user from which the message was received. In this respect, the particular user from which the message is received is determined from the mobile number of the device from which the message was sent, which number is forwarded to the system 50 from the mobile network. Thus, at step 6.4 the session management program 538 accesses the particular user record which stores the received mobile number and reads the session active flag 326 stored in that record. If the session active flag indicates that the user is logged in then processing proceeds to step 618 to be described later. On the contrary, if the session active flag 326 indicates that the user is not presently logged in, then processing proceeds to step 6.6, described next.

More particularly, at step 6.6 the session management program 538 looks at the information received from the message parser program to determine whether the message received is a log-in message. If the received message is not a log-in message, then processing proceeds to step 6.8, wherein the session management program 538 invokes the message formatter program 526 in order to format and send a "not logged in" message. At this point, the SMS formatter program 526 creates a suitable message with the information that the user is not logged in, and sends it to the user mobile device 70 via the mobile network. Processing of the session management program then ends, and as shown in FIG. 4 the overall state of the system returns to the wait state 400.

Instead, if at step 6.6 it is determined that a log-in message has been received, then at step 6.10 the log-in information is validated. This is performed by the session management program by comparing the PIN received within the message with the PIN stored in the users' log-in data 322 in the user record 32. If the received PIN matches the stored PIN then the log-in can be validated, and processing proceeds to step 6.12 wherein the user session active flag 326 is set to indicate that the user has a valid session in progress, and the user session timer 328 is set to the time at which the user logged in. As will be described later, the session timer 328 is used to allow the session to time out, if no further messages are received after a valid log-in. Following step 6.12, at step 6.14 the session management program invokes the SMS formatter program 526, in order to cause it to send a "logged in" message to the user mobile device 70 via the mobile network.

If, on the other hand, at step 6.10 it is not possible to match the received PIN number with the stored PIN number in the log-in data 322, then it is not possible for the session management program 538 to validate the user log-in, and hence the user cannot be logged in to the system. In this case, the session management program 538 invokes the SMS formatter program 526 to send a "log-in failed" message to the user mobile device via the mobile network. This concludes the log-in operations of the session management program, and hence as shown in FIG. 4 the system returns to the wait state 400, either with the user now in a valid session, or not logged in.

Returning to a consideration of step 6.4, if when the message is received the user is already validly logged in (determined by reference to the users' session active flag 326) then processing proceeds to step 6.18, wherein an evaluation is performed on the message content to determine whether it is an alert or watch message, in the formats described previously. If this evaluation returns that the received message is an alert or a watch message (which can be messages either setting or removing alerts or watches) then processing proceeds to step 6.20 wherein the message data is passed to the news monitoring program 534. With reference to FIG. 4, this is where the system enters state 404, as shown. Before exiting, the session management program 408 then performs one last function which is to set the session timer 328 for the user at step 6.26, with the time at which the message was received. This is to record that a message was received from the user during a session, and to therefore prevent the session from timing out for lack of use. Following this step, the session management program then ends.

Returning to step 6.18, if it is determined that the message type is not an alert or watch message, then processing proceeds to step 6.22, wherein an evaluation is performed as to whether the message is a trade message. If this is the case i.e. that the received message is a trade message, then at step 6.24 the message data is passed to the brokerage management program 532, which is invoked by the session management program 538. With respect to FIG. 4, therefore, the system enters state 410 shown therein. Before ending, the session management program 408 sets the session timer 328 in the user record, at step 6.28, for the same reasons as mentioned previously. The session management program then ends.

In contrast, if at step 6.22 the message type is not determined to be a trade message then no further processing is performed and the session management program ends. This might be the case where, for example, the user has sent a second log-in message, when he is already validly logged in. In such a case no further action is necessary.

As described above, therefore, the session management program operates to manage user log-ins, and also to manage a user session to determine whether action should be taken in response to the receipt of a message. It also acts to invoke the appropriate program to process a message, dependent upon the message type.

Returning now to FIG. 4, we will consider the operation of the news monitoring program in state 404. Here, it is determined that the user is validly logged in, and that an alert or watch message has been received from the user. The operations of the news monitoring program 534 are then shown in FIG. 7.

Firstly, at step 7.2 an evaluation is performed as to whether an alert or watch message has been received. In this case, given that the news monitoring program 534 was run by the session management program 538 because the session management program had determined that an alert or watch message had been received, then this evaluation will return true. In this case, processing proceeds to step 7.4.

Here, at step 7.4 an evaluation is performed against the content of the received message to determine whether it is an "add alert" message. The format of an "add alert" message was discussed previously. If this evaluation returns true and the message is an "add alert" message, then processing proceeds to step 7.6, wherein the alert list 336 for the user from which the message was received is accessed, and the alert data contained within the message is added to the list. The format and meaning of the alert data was discussed previously. No further processing is then required of the news monitoring program 404, which then ends, and the system state returns to the wait state 400.

If at step 7.4 it is determined that the message is not an "add alert" message, then at step 7.8 an evaluation is performed to determine whether the message is an "add watch" message. The format of an "add watch" message was discussed previously. If it is determined that the message is an "add watch" message, then the news monitoring program 534 operates to access the stock watch list 338 in the user record 32, and add the watch data (in the form of the indicated stock code) thereto. The news monitoring program then ends, and the system state returns to the "wait" state 400.

If at step 7.8 it is determined that the message is not an "add watch" message, then processing proceeds to step 7.12 wherein an evaluation is performed as to whether the message is a "remove alert" message. The format of a "remove alert" message was discussed previously. If the message is determined to be a "remove alert" message, then processing proceeds to step 7.14, wherein the news monitoring program 534 accesses the user alert list 336 and removes the indicated alert data therefrom. Processing of the news monitoring program then ends, and the system returns to the wait state 400.

Finally, if the evaluation of step 7.12 determines that the message is not a "remove alert" message, then processing proceeds to step 7.16, wherein an evaluation is performed as to whether the message is a "remove watch" message. If this is the case then processing proceeds to step 7.18, wherein the user stock watch list 338 is accessed, and the indicated stock is removed from the list. Processing by the news monitoring program 534 then ends, and the system returns to the wait state. Likewise, if the message is not determined at step 7.16 to be a remove watch message, then processing similarly ends, as a mistake in message parsing, or some other syntax error may have occurred.

The above described operations 7.2 to 7.18 are those performed by the news monitoring program at state 404. The remainder of the operation of the news monitoring program 534 shown in FIG. 7 will be described later.

Returning now to FIG. 4, the operation of the brokerage management program in the state 410 will now be described. At this point, the brokerage management program has been evoked by the session management program from state 408, because a trade message has been received from the user.

Figure 8:
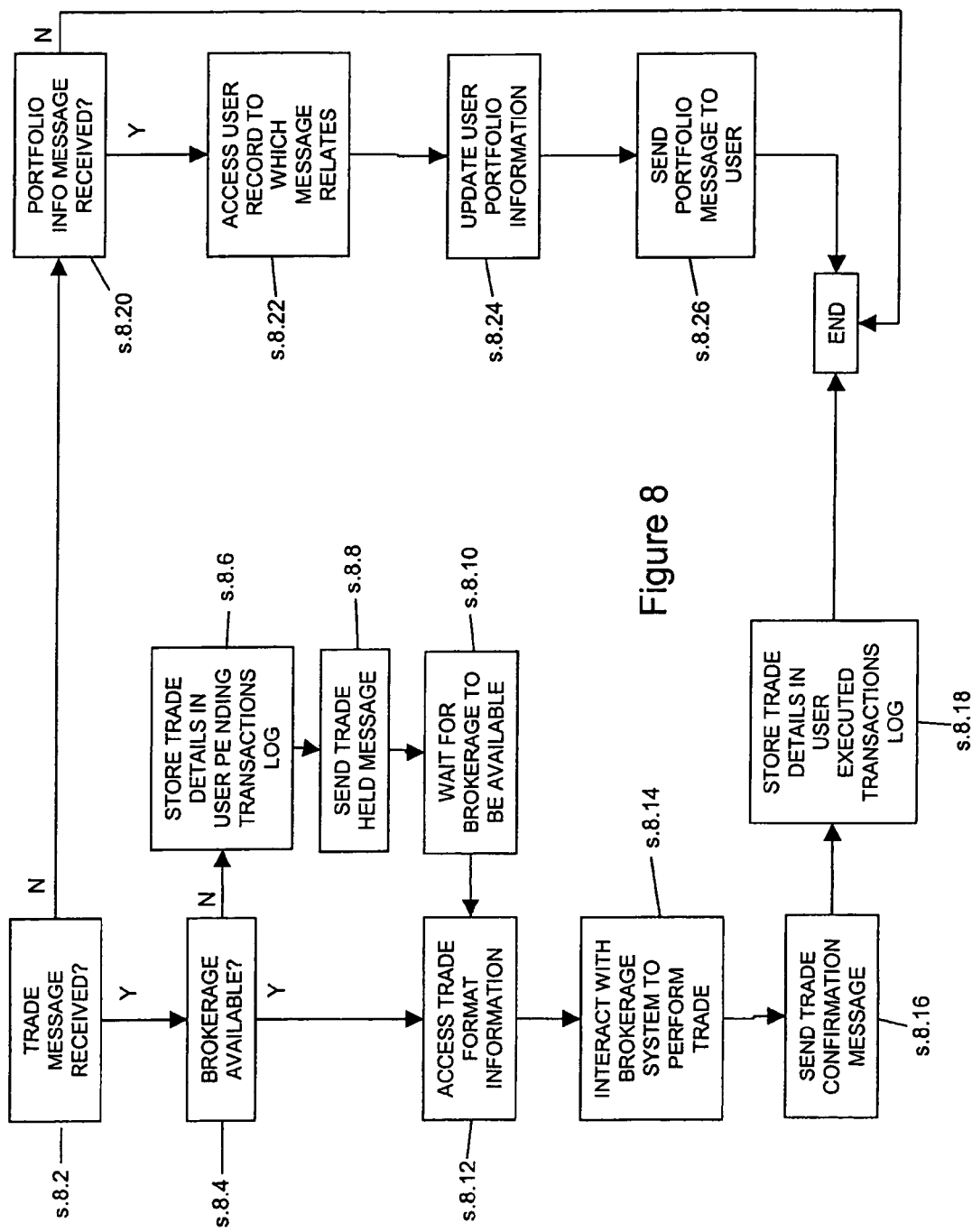
FIG. 8 is a software flow diagram illustrating the operation of a brokerage management program used in an embodiment of the present invention.

The operations performed by the brokerage management program in state 410 are shown in the left hand part of FIG. 8. With reference to FIG. 8, firstly, at step 8.2 the brokerage management program 532 performs an evaluation as to whether a trade message has been received. This evaluation is performed using information passed to the brokerage management program by the session management program 538 in state 408, the session management program having obtained the information from the message parser program 524 in state 406. If the brokerage management program determines that a trade message has been received, which in this case will be the case as the brokerage management program was invoked by the session management program for that very reason, then processing proceeds to step 8.4.

In step 8.4 a further evaluation is performed as to whether brokerage is available at this time. Brokerage may not be available for several reasons, such as, for example, the brokerage server 20 being down, or because, for some systems, the markets are not yet open. If brokerage is not yet available, then processing proceeds to step 8.6, wherein the trade details specified by the user in the message are stored within the user pending transactions log 330 in the particular user record 32.

Then, at step 8.8 the brokerage management program 410 invokes the SMS formatter program 526 in order to send a "trade held" message to the user, via the mobile network at step 8.8. Next, the processing thread enters a wait state and waits for brokerage to be available at step 8.10. This wait state can be of determinate time i.e. where the market is waiting to open, or of indeterminate time, for example where the brokerage server is down for particular reasons, and must come back online for the trade to be processed. Once brokerage is available, processing proceeds to step 8.12. Please note that step 8.12 can therefore be entered either from step 8.10 or step 8.4, if brokerage is immediately available when the message is first received.

At step 8.12 the brokerage management program 532 accesses the trade format information 542. The trade format data 542 contains the necessary information to enable the brokerage management program 532 to interact with the brokerage server 20. That is, therefore, the trade format data 542 contains the various message syntax formats expected by the brokerage server 20. In other embodiments, where, for example, the brokerage server 20 uses a web-based system, the trade message format data 542 may consist of suitable scripts to allow the brokerage management program 532 to interact with the web page interface presented by the brokerage server 20. In this respect, the trade message format data 542 can make reference to the user specific brokerage server log-in data 324 stored in the user record 32.

Having accessed the trade message format data 542, the brokerage management program 532 then performs step 8.14, in that it interacts with the brokerage system to perform the trade. The precise form of interaction will depend upon the brokerage system being used, and as discussed above may consist of messages in predetermined formats being passed to the brokerage system, together with authentication and validation data specific to the user as appropriate. In alternative embodiments, where the brokerage server is web based, for example, the interaction of step 8.14 may consist of running specific scripts, such as XML scripts or the like, to allow the brokerage management program 532 to use the web interface provided by the brokerage server. Again, such scripts may use the user brokerage server log-in data 324 stored in the user record 32, as required.

Howsoever the interaction with the brokerage system is performed, once the trade has been confirmed by the brokerage system, at step 8.16 a trade confirmation message is sent by the brokerage management program 532. As before, this is performed by the brokerage management program 532 invoking the SMS formatter program 526 to send an appropriate message via the mobile network to the users' mobile device 70. Following such a confirmation, at step 8.18 the details of the trade are stored in the user executed transactions log 332 in the user record 32. Processing via the brokerage management program 532 in state 410 then ends.

With the above, therefore, the brokerage management program 532 is able to act in response to trade messages received from a user mobile device, in order to interact with the back end brokerage system to perform a trade. Trades envisaged may be buy or sell orders of stocks or shares indicated by the user in his sent trade message. Such a system allows for transactions to be performed by a user using messages sent from a standard mobile device. In addition, pre-orders of trades may be made by the user when brokerage is unavailable, which are then acted upon once brokerage becomes available.

Following the operation of the brokerage management program in state 410, with reference to FIG. 4 the stock information and trading system 50 returns to the central wait state 400.

Thus far, with respect to FIG. 4 we have described the actions performed by the system 50 when a message is received from a user mobile device 70. However, the system 50 is also responsive to inputs from the news server 10, and the portfolio server 30. In addition, the system 50 also operates the session management program regularly after a set period of time, such as every five minutes, for example. The states entered by the above edge conditions are noted as states 402, 412 and 414 in FIG. 4. These will be described in detail next.

Firstly, consider the system is in the wait state 400, and a news item arrives from the news server 10. The news item should contain the three letter stock code of the company to which the news item relates. When such a news item arrives, the system exits state 400 and enters state 402 wherein the news monitoring program 534 is run. The operation of the news monitoring program 534 in state 402 is described next with respect to FIG. 7.

As described previously, firstly at step 7.2 the news monitoring program 534 determines whether an alert or watch message has been received. In this case, such a message has not been received, and hence processing proceeds to step 7.20, wherein an evaluation is determined as to whether a news item has been received. If a news item has not been received, then the news monitoring program appears to have been invoked unnecessarily, and hence ends. On the contrary, if a news item has been received, then processing proceeds to step 7.22. At step 7.22 a determination is undertaken as to the stock symbol to which the received news item relates. As mentioned previously, the system 50 is arranged to receive news items from the news server 10, wherein the news items are indexed by the three letter stock symbol to which each item relates. At step 7.22, this three letter stock symbol is determined. Processing then proceeds to step 7.24.

At step 7.24, a processing FOR loop is commenced which performs the processing steps noted below for each user. That is, on each iteration of the for loop, one of the user records is accessed, in order to process the records for that particular user.

The first step within an iteration of the for loop is step 7.26, wherein for the particular user record being processed, that users' stock watch list 338 is accessed in the particular user record 32. At step 7.28 an evaluation is then performed to determine whether the stock symbol determined at step 7.22 (being the stock to which the received news item relates) is contained within the users' stock watch list 338. If the determined symbol is within the users' stock watch list 338, then at step 7.30 the news monitoring program 402 runs the message formatter program 526, in order to format a message so as to contain the contents of the news item, and to send it to the users' mobile device via the mobile network. Processing then proceeds to step 7.32. On the contrary, if at step 7.28 it is determined that the stock symbol to which the news item relates is not in the stock watch list then processing also goes to step 7.32. At step 7.32 an evaluation is performed as to whether each user has been processed by the for loop commenced at step 7.24, and if each user has not been processed, then the next user record is selected, and steps 7.26, 7.28 and 7.30 repeated for that user. If the evaluation at step 7.32 indicates that all of the users for which user records are stored have been processed, then processing proceeds to step 7.34.

At step 7.34, a second FOR processing loop is commenced, again to process each user record in turn. The first processing step in this second for loop is at step 7.36, wherein the alert list 336 in the user record presently being processed is accessed. Then, at step 7.38, a further, nested, FOR processing loop is commenced, in order to process each alert in the alert list within the user record presently being processed by the outer FOR loop. The first processing step within this nested for loop is step 7.40, wherein an evaluation is performed as to whether the present alert being processed relates to the symbol determined at step 7.22. If this is not the case, i.e. the symbol specified in the alert presently being processed is not the same as the symbol to which the news item relates as determined by step 7.22, then processing proceeds to step 7.46, wherein an evaluation is undertaken as to whether all of the alerts in the alert list 336 in the present user record 32 have been processed. If there are alerts left to process, then the nested for loop is commenced again with the next alert in the list. On the contrary, if all of the alerts in the present list have been processed, then processing proceeds to step 7.48 wherein an evaluation is undertaken as to whether each user record has been processed.

Returning to step 7.40, if it is determined that the alert presently being processed does relate to the determined stock symbol, then processing proceeds to step 7.42, wherein an evaluation is performed between the specified logical conditions within the alert presently being processed, and the content of the received news item. Thus, for example, if the alert presently being processed specifies a particular price change for the stock to which the alert relates, and the news item indicates that that price change has occurred, then the alert logical condition has been met, and step 7.42 can return a positive value. Similarly, if the alert specifies a trade volume, and the news item contains information relating to such a trade volume, then the alert condition can be said to have been met. When the alert condition is met, then at step 7.42 processing proceeds to step 7.44, wherein the news monitoring program 534 causes the message formatter program 526 to run, so as to send a message to the user whose record is presently being processed, containing the contents of the news item.

Following step 7.44 or if the evaluation of step 7.42 specifies that the particular alert presently being processed has not been met, processing proceeds to step 7.46. Step 7.46 causes the for loop commenced at step 7.38 to be run for every alert in the alert list of the user whose record is presently being processed. Once all of the alerts have been processed in the present users' alert list, then step 7.48 causes the for loop commenced at step 7.34 and containing step 7.36 to step 7.46 to be run for the next user record, until all user records have been processed. Once all the user records have been processed in this way, then step 7.48 causes the news monitoring program to end, and the system state returns from state 402 to the wait state 400.

With the above processing, therefore, when a news item is received it is compared to the stock watch list for each user, and also to each alert in the alert list for each user, to determine whether the news item should be forwarded to the users' mobile device 70 as a message. With such processing, the user can be informed of news in which he has registered an interest as such news is received from the news server 10.

Referring again to FIG. 4, the actions performed by the system 50 when a portfolio information message arrives from the portfolio server 30 will be described. In this case, the system leaves the wait state 400, and enters the state 412, wherein the brokerage management program is run. It is anticipated that a portfolio information message will arrive from the portfolio server 30 at the end of each day's trading, although in other embodiments the time at which such messages are received can be variable.

Referring to FIG. 8, in state 412 when run, the brokerage management program first performs the evaluation of step 8.2, wherein an evaluation as to whether a trade message has being received is performed. In this case, a trade message has not been received, but instead a portfolio information message has been received. Therefore, processing proceeds to step 8.20, wherein an evaluation that such a portfolio information message has been received is performed. If this evaluation returns negative i.e. a portfolio information message has not been received, either, then the brokerage management program must have been run in error, and hence processing ends. In contrast, if at step 8.20 it is determined that a portfolio information message has been received, then processing proceeds to step 8.22.

As an aside, please note that it is not necessary to run the message parser program in order to determine that a portfolio information message has been received, for the reason that such a message will be received on a specific port of the system, the port being that which is connected logically to the portfolio server 30. Therefore, any messages received on that input port can be assumed to be portfolio information messages.

Returning to FIG. 8, at step 8.22 the particular user record 32 to which the portfolio message relates is accessed. In this respect, it is envisaged that the received portfolio information message will contain a user ID, specifying the user to which the information contained in the message relates. It is further envisaged that the received portfolio information message contains portfolio information relating the particular users' portfolio, in the format:—

SYMBOL/PRICE/VOLUME HELD/TOTAL VALUE
e.g. NBK/575.00/10000/57500.00

Here, the individual stock price is given in secondary currency units such as cents, whereas the total value figure is given in primary currency units such as dollars.

It is envisaged that the price and holdings of a particular user for each stock which he holds is depicted in the above manner, such that any particular portfolio information message contains a data tuple with the above format for each particular stock held.

With the portfolio information message in such a format, at step 8.24 the contents of the message can be stored within the users' portfolio list 340, in the specific user record 32. This is performed at step 8.24. Next, at step 8.26 a portfolio message conveying the information in the same format can be constructed, and sent to the user mobile device 70 via the mobile network. As before, the SMS formatter program 526 is invoked to format and send such a message. Following the processing of step 8.26 to send this message, the brokerage management program 532 ends, and the processing state leaves state 412 to return to the wait state 400.

With the above operation, a user portfolio can be maintained in an updated form, and information concerning the users' portfolio can be transmitted to the users' mobile device.

Finally, with respect to FIG. 4, it is necessary to run the session management program 538 every few minutes, in order to perform session housekeeping functions. Therefore, when in state 400, every few minutes, for example every three to five minutes, the state 414 is entered, in which the session management program 538 is run.

The purpose of running the session management program in state 414 is to perform session housekeeping functions for each user. More particularly, when run in state 414 the session management program acts to access each user record in turn, and determine whether the session active flag 326 in each user record indicates that the user has an active logged-in session. If, for the particular record being processed, the session active flag 326 indicates that the user is logged-in, then the session management program 538 then looks at the session time stamp 328, and compares the time stamp with the present system time. It will be recalled that the session time stamp 328 is updated when the user logs in, whenever he sends a valid message to the system, during a logged-in session. If the user has recently logged-in, or has sent a system message recently during a logged-in session then the session time stamp 328 will note the time at which that message was sent. If that time stamp indicated time is within the last Y minutes in comparison to the system time, then the session management program 538 takes no action, and leaves the session active flag 326 indicating that the user is validly logged-in. In contrast, if the session time stamp 328 indicates that the last user transaction occurred more than Y minutes previously in comparison to the system time, then the user has not sent a valid message within the last Y minutes, and hence it is safe to end the users' session. When this is the case, the session management program 538 changes the session active flag 326 for the present user record being processed, to indicate that the users' session has ended. In such a case, if the user tries to send a transaction message, then as described previously the session management program 538 when running in state 408 will indicate that the user is not logged-in. Such operation is for security purposes, and acts to automatically end the users' session when no transaction messages have been received within the last Y minutes. The value of Y can be any appropriate value, but it is thought that values between 2 and 10 minutes would be most appropriate.

With the above, therefore, a user can be automatically logged-out of a user session, when he is not making any transactions.

Various modifications can be made to the above described embodiment, to produce further embodiments of the invention. For example, depending on the mobile technology used, but in particular where GPRS and UMTS technologies are being used which support multimedia messaging services and other picture messages, it is possible not only to send text based news messages to a user, but also to send pictorial information, such as charts, graphs or the like. Thus, where pictorial information is received from news server 10, and provided that picture messaging is supported by the particular mobile technology being used by the user, that pictorial information can be forwarded as a news message. In this case, the determination as to whether pictorial information should be forwarded to a particular user can be made in exactly the same manner as described above, and in particular with respect to the users' alert list, and stock watch list. Thus, if, for example, a user is interested in receiving pictorial messages relating to a particular stock, for example showing a history of the stock's price over a preceding time frame, the user can add that stock to his stock watch list 338, and any graphical information received from the news server 10 relating to that stock can then be forwarded by the news monitoring program.

Various further modifications to produce other embodiments of the invention will be apparent to those skilled in the art, all of which are intended to be encompassed by the appended claims.

The invention claimed is:

1. A transaction interface system comprising: an input arranged to receive user messages sent via a mobile telecommunications network from user mobile devices;
    a message parser arranged to parse said user messages received at said input in accordance with a predetermined lightweight message syntax, to determine the information content of each message; a transaction controller arranged to perform one or more user transactions in response to the information contained within said user messages as determined by said message parser,
    wherein one or more of the user messages contain data specifying information to be forwarded to a user mobile device, and a second input arranged to receive information content from an information source, the transaction controller being further arranged to compare the received information content at said second input with the user specified information, and to forward received information content to the user mobile device via the mobile telecommunications network in the event that it corresponds to the user specified information.

2. A transaction interface system according to claim 1, wherein one or more of the user messages additionally contain information filter data, the transaction controller being arranged to apply said filter data to one or more predetermined logical conditions to determine if received information content corresponding to user specified information content should be sent to the user mobile device, in dependence on the logical conditions.

3. A transaction interface system according to claim 1, wherein the received information content is forwarded to a user in any message format belonging to the group of formats comprising: short message service (SMS) messages, multimedia message service (MMS) messages, or email messages.

4. A transaction interface method comprising the steps of:
    receiving user messages sent via a mobile telecommunications network from user mobile devices;
    parsing said received user messages in accordance with a predetermined lightweight message syntax, to determine the information content of each message; and
    performing one or more user transactions in response to the information contained within said user messages, wherein one or more of the user messages contain data specifying information to be forwarded to a user mobile device;
    receiving information content from an information source;
    comparing the received information content with the user specified information;
    forwarding received information content to the user mobile device via the mobile telecommunications network in the event that it corresponds to the user specified information.

5. A transaction interface method according to claim 4, wherein one or more of the user messages additionally contain information filter data, the method further comprising:—
    applying said filter data to one or more predetermined logical conditions to determine if received information content corresponding to user specified information content should be forwarded to the user mobile device, in dependence on the logical conditions.

6. A transaction interface method according to claim 4, wherein the received information content is forwarded to a user in any message format belonging to the group of formats comprising: short message service (SMS) messages, multimedia message service (MMS) messages, or email messages.

7. A message-based transaction interface system for allowing transactions to be instructed from a mobile telecommunications device, the system comprising:—
   a) an input logically connected to a mobile telecommunications network and arranged to receive user messages sent via said mobile telecommunications network from user mobile telecommunications devices;
   b) a parser arranged to parse said user messages received at said input, to determine the information content of each message;
   c) an information store storing interface information which in use allows the transaction interface system to communicate with a back-end brokerage system which performs a transaction; and
   d) a transaction controller arranged in use to:—
      i) access the interface information to generate control data for the control of said back-end brokerage system; and
      ii) to transmit said control data to said back-end brokerage system to control said back end brokerage system to perform the transaction;
   wherein:—
   e) the received user messages are arranged in accordance with a predetermined lightweight message syntax which contains, within a single message, a set of information needed to define the transaction to be performed; and wherein
   f) said parser parses said message in accordance with said predetermined lightweight message syntax to determine transaction information contained within a received message and defining the transaction to be performed; and
   g) said transaction controller receives said transaction information from said parser, and, on receipt of said transaction information, generates said control data in dependence on said transaction information and transmits said control data to said back-end brokerage system;
   and wherein the transaction comprises a purchase or sale of stocks and/or shares, and the a transaction is capable of being instructed and performed upon receipt of a single user mobile message.

8. A transaction interface system according to claim 7, wherein, if the user transaction cannot be performed upon receipt of the message ordering the transaction, the transaction information is buffered in data storage until such time as said transaction may be performed.

9. A transaction interface system according to claim 7, wherein the user messages are in a format of any one belonging to the group of formats comprising: short message service (SMS) messages, multimedia message service (MMS) messages, or email messages.

10. A message-based transaction interface method for allowing transactions to be instructed from a mobile telecommunications device, the method comprising:—
   a) receiving, at an input logically connected to a mobile telecommunications network, user messages sent via said mobile telecommunications network from user mobile telecommunications devices;
   b) parsing said user messages received at said input, to determine the information content of each message;
   c) storing interface information which in use allows communication with a back-end brokerage system which Performs a transaction;
   d) accessing the interface information to generate control data for the control of said back-end brokerage system; and
   e) transmitting said control data to said back-end brokerage system to control said back end brokerage system to perform the transaction;
   wherein:—
   f) the received user messages are arranged in accordance with a predetermined lightweight message syntax which contains, within a single message, a set of information needed to define the transaction to be performed; and wherein
   g) said parsing step parses said message in accordance with said predetermined lightweight message syntax to determine transaction information contained within a received message and defining the transaction to be performed; and
   h) when said transaction information is determined, said control data is generated in dependence on said transaction information and transmit to said back-end brokerage system;
   and wherein the transaction comprises a purchase or sale of stocks and/or shares, and the transaction is capable of being instructed and performed upon receipt of a single user mobile message.

11. A transaction interface method according to claim 10, wherein, if the user transaction cannot be performed upon receipt of the message ordering the transaction, the transaction information is buffered until such time as said transaction may be performed.

12. A transaction interface method according to claim 10, wherein the user messages are in a format of any one belonging to the group of formats comprising: short message service (SMS) messages, multimedia message service (MMS) messages, or email messages.

13. A computer program or suite of computer programs arranged such that when executed by a computer system they cause the computer system to operate in accordance with the method of claim 10.

14. A computer readable storage medium storing a computer program or one or more of the suite of computer programs according to claim 13.

* * * * *